(12) United States Patent
Andrews

(10) Patent No.: US 7,727,500 B2
(45) Date of Patent: Jun. 1, 2010

(54) PROCESS FOR PRODUCING METAL PEROXIDE FILMS

(75) Inventor: John W. Andrews, Madison, CT (US)

(73) Assignee: PURETI, Inc., New York, NY (US)

( * ) Notice: Subject to any disclaimer, the term of this patent is extended or adjusted under 35 U.S.C. 154(b) by 0 days.

(21) Appl. No.: 11/683,675

(22) Filed: Mar. 8, 2007

(65) Prior Publication Data
US 2008/0035025 A1 Feb. 14, 2008

Related U.S. Application Data

(62) Division of application No. 10/826,565, filed on Apr. 16, 2004, now Pat. No. 7,205,049.

(51) Int. Cl.
*C09C 1/36* (2006.01)
(52) U.S. Cl. .................... 423/263; 423/592.1; 423/508; 423/509; 423/618; 423/594.17; 423/608; 423/609; 423/610; 423/625; 423/632; 423/624; 977/773; 977/774; 977/775; 977/776; 977/777; 977/810; 977/811; 977/896; 75/711
(58) Field of Classification Search ................. 423/263, 423/592.1, 508, 509, 618, 594.17, 608–610, 423/625, 632, 624; 977/773–777, 810, 811, 977/896; 75/711
See application file for complete search history.

(56) References Cited

U.S. PATENT DOCUMENTS

| 5,403,513 | A | | 4/1995 | Sato et al. | |
| 5,840,111 | A | * | 11/1998 | Wiederhoft et al. | 106/436 |
| 6,107,241 | A | | 8/2000 | Ogata et al. | |
| 6,344,277 | B1 | | 2/2002 | Ogata et al. | |
| 6,429,169 | B1 | | 8/2002 | Ichinose | |
| 6,527,825 | B1 | * | 3/2003 | Gruenbauer et al. | 75/362 |
| 6,884,752 | B2 | | 4/2005 | Andrews | |

* cited by examiner

*Primary Examiner*—Steven Bos
(74) *Attorney, Agent, or Firm*—Myers Wolin, LLC

(57) ABSTRACT

Disclosed are adhesive coating compositions containing a metal peroxide for producing clear colorless adhesive coatings on substrates, particularly micro particulate substrates. In one preferred embodiment the nanoparticle coatings are chemically active and function at a high level of efficiency due to the high total surface area of the micro particulate substrate. Also disclosed are coated substrates and compositions having nanoparticles bound to a substrate by the coating compositions.

10 Claims, No Drawings

PROCESS FOR PRODUCING METAL PEROXIDE FILMS

CROSS REFERENCE TO RELATED APPLICATION

This application is a divisional application of and claims the benefit of any priority from allowed application U.S. Ser. No. 10/826,565 filed Apr. 16, 2004.

BACKGROUND OF THE INVENTION

1. Field of the Invention

The present invention relates to adhesive coating compositions containing a metal peroxide for producing clear colorless adhesive coatings on substrates, particularly micro particulate substrates. The coating composition changes the chemical and physical characteristics of the substrate in useful ways in itself and may also be utilized as a vehicle for the attachment of nano or micro particles to a substrate, particularly a micro particulate substrate. The coating compositions are uniquely able to adhere nanoparticles to substrates without interfering with the physical or chemical characteristics of the applied nanoparticles. In one preferred embodiment the nanoparticle coatings are chemically active and function at a high level of efficiency due to the high total surface area of the micro particulate substrate.

2. Brief Description of Related Developments

Many attempts have been made to provide coatings for hydrophobic surfaces, particularly glass substrates.

A number of references relate to the use of titanium peroxides. Ogata et al, U.S. Pat. No. 6,344,277 dated Feb. 5, 2002 and entitled "Coating method of amorphous type titanium peroxide" describes a method for coating a substrate having a water repellant surface with viscous amorphous type titanium peroxide in the absence of a surface active agent.

Ogata also provides a description of the state of the art with regard to titanium peroxide coating solutions.

As disclosed in Ogata et al, titanium peroxide coating solutions for film formation comprising peroxopolytitanic acid [a polymer of peroxotitanic acid] are known to the art. These peroxopolytitanic acids are obtained by adding hydrogen peroxide to a gel or a sol of titanium oxide hydrate or a mixed dispersion thereof, and then treating the mixture at room temperature or heating it at 90 C. or less.

As disclosed in Ogata et al., a viscous product can be obtained as a yellow film by adding aqueous hydrogen peroxide to a fine powder of titanium hydride to prepare a yellow aqueous titanium peroxide solution, and then evaporating water from this yellow aqueous titanium peroxide solution. However, Ogata describes this product as being stable only in an extremely low concentration and only for a short time. Moreover, a thin layer formed from this product on a substrate is easily cracked or peeled off and the thin layer becomes porous after a high-temperature calcination.

However, Ogata discloses that the peroxopolytitanic acid obtained by adding hydrogen peroxide to a gel or a sol of titanium oxide hydrate or a mixed dispersion thereof, and then treating at ordinary temperature or heating it at 90° C. or less, is different from the viscous amorphous type titanium peroxide of the '277 patent. The product of the '277 patent is obtained by adding hydrogen peroxide to titanium oxide hydrate and carrying out the reaction at 15° C. or less. Ogata recognizes that the products are significantly different from each other in physical properties, particularly viscosity, that the conventional product is poor in the function as a binder and that it is difficult to form a thin layer of the material.

H. Ichinose et al., in the Journal Of The Ceramic Society Of Japan, titled "Synthesis Of Peroxo-Modified Anatase Sol From Peroxo-Titanic Acid Solution", Vol. 104, pages 914-917 (1996), and "Photocatalytic Activities Of Coating Films Prepared From Peroxotitanic Acid Solution-Derived Anatase Sols", Vol. 104, No. 8, pages 715-718 (1996), describe a process to put small amounts (0.85% to 1.7%) of various forms or shapes (polymorphs) of titanium dioxide ($TiO_2$) into aqueous solution by reaction with hydrogen peroxide. These solutions are called titanium peroxidases—$TiO(OOH)_2$. The amorphous titanium dioxide is the ingredient that results in the film-forming and adhesive characteristics of the product. The mixture is composed of equal weights of the amorphous and anatase (crystalline) forms of titanium dioxide, is soluble in water in up to about 2% by weight of the composition and can be applied at ambient conditions. It is not, however, clear or colorless.

Photocatalysts such as titanium oxide and zirconium oxide are known to be effective for decomposing a harmful organic compound or $NO_x$ into harmless substances by irradiation with an actinic radiation such as UV light. Many such photocatalysts are in the form of fine powder, making it difficult to recover the catalysts from reaction mixtures.

Tanaka, U.S. Pat. No. 5,658,841 proposes solving this problem by fixing the powder catalyst to a suitable support with a binder resin. A composite catalyst is provided which comprises a substrate, and a catalytic layer supported on the substrate and including 100 parts by weight of particles of a photocatalyst dispersed in 6-32 parts by weight of a matrix of an alkali metal silicate. Illustrative of suitable alkali metal silicates are sodium silicate, potassium silicate and lithium silicate. These silicates may be used by themselves or as a mixture of two or more. Water glass is advantageously utilized as the binder.

Ichinose, U.S. Pat. No. 6,429,169 describes a procedure for creating a photo catalytically active titanyl peroxide solution. Equal parts by weight of anatase $TiO_2$ particles are suspended in this solution to create the photo catalytic effect. For the uniform suspension, Ichinose suggests employing ultrasonic waves after mechanical agitation.

The sol concentration of Ichinose is usually adjusted to a level of 2.70 to about 2.90% or to a level of 1.40 to about 1.60% by dilution with distilled water. As reported by Ichinose, when the amorphous titanium peroxide sol is heated to 100° C. or above, it is converted to anatase titanium oxide sol. After coating on a substrate and drying, the amorphous titanium peroxide sol is heated to 250° C. or above to convert it to anatase titanium oxide.

Unfortunately, Ichinose's amorphous titanium peroxide films are yellow colored, prohibiting or severely limiting their use in applications where a clear or white coating is desirable or necessary. A second disadvantage of the derived products using the Ichinose process is that the coating itself is cloudy and opaque. The yellow coloration is due to the peroxide content of the solution; the turbidity is due to the size of the $TiO_2$ particles in the solution.

U.S. Pat. Nos. 6,107,241 (Ogata et al.) and 6,429,169 (Ichinose) disclose an anatase titanium oxide sol which is a yellow suspension made by adding aqueous ammonia or sodium hydroxide to a titanium salt solution, such as titanium tetrachloride, washing and separating the formed titanium hydroxide, treating the formed titanium hydroxide with aqueous hydrogen peroxide, and heating the formed stable amorphous titanium peroxide sol having a concentration of about 2.9%, and a yellow color, to a temperature of 100° C. or higher to form an anatase titanium oxide sol.

The amorphous titanium peroxide sol has good bonding strength but poor wettability for substrates and is yellowish in color.

However, even small amounts of ingredients having particle sizes above about 10 nanometers will render the composition opaque and unsatisfactory for use on transparent substrates. Furthermore, the coating must be applied in the form of several layers or dips to provide adequate bonding. And the end result is that the yellowish color of each layer is intensified to produce an unsatisfactory appearance on clear substrates. Multiple layers are necessary because the peroxide-forming film is very hydrophobic so that the coating composition does not have good wetting properties and tends to bead, leaving "holidays" or uncoated areas and requiring multiple over layers.

Thus, there are major detriments associated with the use of the adhesive coatings of the prior art. The titanium peroxide film former is very hydrophobic and does not wet out to form a continuous film on the substrate, necessitating the application of a heavy amount or thick layer of the composition in order to form a continuous film or covering. The surface tension of the peroxide-containing film is to some degree overcome by the added thickness and weight of the film but the additional material usage and the time and labor required for such application makes the use of the product somewhat impractical.

In addition to the wettability problem, the adhesive coating film is formed with difficulty, and is yellowish in color due to the presence of unreacted titanyl peroxide. This is aggravated if the weight and thickness of film is increased to overcome the surface tension of the titanyl peroxide solution to form a continuous coating on the substrate.

The transparency and clarity of the coating(s), when applied on a clear substrate, is impaired due to the thickness required to overcome the non wettability of the substrate. The refractive index of the film so produced and the excessive thickness causes moire patterns and a seemingly rainbow effect when viewed through clear glass.

The titanium peroxy acid (TPA=titanium oxyperoxide=$TiO(OOH)_2$ solution has a yellow coloration that remains in the product even when it is mixed with nanoparticles of anatase. This yellow coloration is objectionable on clear substrates. It is highly desirable, and necessary for many uses, such as in food, medical and hygienic applications, to remove entirely, or to reduce as much as possible, the yellow coloration, and to provide clear adhesive coatings. For the use of coatings over glass, a clear non-yellow coating that matches the transparency of the glass is desired.

In numerous commercial products, pigment blends are used to create color and visual effects that aesthetically appeal to consumers. Because different consumers have different preferences to various visual effects, a designer's ability to create and control these effects is often important to the marketability of a product. Often, additives such as coated mica flakes, metal flakes, and glass flakes have been used in pigment blends to enhance the visual appeal of items such as automobiles, boats, planes, appliances, signs, painted surfaces, fabrics, and other consumer goods.

Coated mica flakes, for example, are one of the more common additives used to improve luster and depth of color of paint compositions on cars. Metal flakes, such as aluminum flakes, are another common additive used to improve the sparkle of paint and coatings.

While the aforementioned additives offer some of the visual effects that typically appeal to consumers, a need remains for an economical pigment blend that enables a designer to create and control a broader range of visual effects. Moreover, a need always exists for improved ways to enhance the functional properties of paint and coating compositions, such as increased durability, increased travel, improved pattern control, and UV screening, Micro particles provide an attractive substrate for a range of surface treatments because of the inverse relationship between the volume of the particle and its surface area. The positive effects of this relationship are increased as the size of the particle decreases. Micro particles composed of a myriad of substances and of infinite geometric configurations are known. Particles having known or regular geometries are most useful in many applications. Particles such as glass, ceramic or other inorganic spheres with regular geometries and the ability to withstand environmental stresses are known to be useful in many diverse applications.

In particular, glass microspheres that range in size from 4 to 50 microns in diameter provide a very effective delivery mechanism for a range of surface treatments that deliver performance characteristics or aesthetic effects.

Because of the inverse relationship between volume and surface area noted above (as the volume of the individual glass spheres decreases, the total surface area represented by a mass of glass spheres increases because so many more microspheres can fit in the same volume of space), microspheres maximize the impact or effect of any surface treatments applied to them. In addition, glass is a strong material (with a higher value than steel on the Moh's Hardness Scale), can typically withstand crush strengths of 40,000 psi and is virtually inert. The spherical shape of glass microspheres facilitates their blending with, and incorporation into, other materials and promotes their smooth dispersion.

Glass microspheres can be produced from different materials, depending upon the application. The most common glass microsphere is made of soda lime glass, but microspheres are also made of barium titanate and boro-silicate glasses. Soda lime glass is relatively inexpensive compared to higher refractive glasses such as barium titanate. By applying this mineral film to the surface of soda lime glass spheres, the refractive index has been measured to have increased from 1.42 to >2.0. This discovery allows the RI of the less expensive soda lime sphere to be increased in a cost effective manner.

In general, smaller spheres improve impact strength. Larger spheres tend to improve flow properties. Solid glass beads of soda-lime glass typically have a specific gravity of 2.46 to 2.50 g/cc, a refractive index of 1.51 to 1.52, a softening point of 730° C., and the appearance of an odorless white powder.

Microbeads are also used in cosmetic applications. Microspheres of calcium aluminum borosilicate are used in cosmetic formulations to provide a smooth, silky feel and to improve application properties. The spheres are chemically inert, have very low oil absorption, and are nonporous. These spheres typically have a specific gravity of 0.1 to 1.5 g/cc and have a softening point of about 600° C. and a mean diameter of 9 to 13 μ

Microbeads of glass, polymers or ceramic composition have demonstrated industrial usefulness both for their chemical and physical properties.

Polymer powders of various configurations may be formed by mechanical, solution and dispersion methods. See U.S. Pat. No. 4,929,400. A description appears in Lerman et al., U.S. Pat. Nos. 3,586,654 and 4,221,862 and Sowman, U.S. Pat. No. 4,349,456 (which discloses various hollow, blown, expanded, or solid spherical particles, or microspheres, of various refractory materials useful, for example, as fillers for plastic composites or the like, have been disclosed, patented or used in the past, e.g. see U.S. Pat. Nos. 2,340,194, 3,264,073, 3,273,962, 3,298,842, 3,365,315, 3,380,894, 3,528,809 and 3,748,274, British Pat. Nos. 1,122,412 and 1,125,178, French Pat. No. 2,047,751, and Belgium Pat. No. 779,967. The particles or microspheres and/or their methods of preparation disclosed in these references have one or more disadvantages or limitations which have handicapped their commercialization or restricted their field of application.

Many applications require the modification of the inherent characteristics of the microbeads. In some cases, a surface treatment may modify the characteristics of the beads and permit the use of the modified beads in new applications. In some instances the beads themselves have useful functional or aesthetic characteristics. In other instances the beads are used as a carrier for a functionally active material placed on its surface.

One of the inherent problems in applying a coating to microbeads of varying composition is the inherent hydrophobicity of the beads. This prevents or inhibits the use of water based coatings and requires the use of more sophisticated and environmentally hazardous solvent based systems.

It would be desirable to produce a titanium peroxide composition that could be applied to surfaces such as glass and dried under ambient conditions to form clear coatings.

It would be of great benefit to the art to provide a coating for microbeads of varying composition where the coating can be applied by conventional coating or dipping processes, where the coating is aqueous based and where the coating application takes place under ambient conditions.

It is the object of this invention to produce a clear colorless inorganic and photocatalytic coating for substrates used in public places such as hospitals, as well as for self cleaning glass.

It is a further object of this invention to provide a binder product having particle sizes less than 10 nanometers in diameter.

It is a further object of this invention to provide a binder product having particle sizes less than 10 nanometers while providing photo-catalytic activity.

It is also an object of the present invention to bind nanoparticles of metallic oxides and pigments onto glass, ceramic, polymeric and metallic substrates.

It is an object of the present invention to provide a simply controlled process for the production of nanoparticles of metallic oxides.

It is an object of the present invention to provide coated microparticles, particularly spherical microparticles that may be used as a carrier for various nanoparticles attached thereto by the coating.

The exact structure of the deposited mineral film after the peroxide reacts or dissipates is not known but it is assumed to be somewhat linear as the peroxide monomer form has only two reactive groups attached to it. Both the rutile and anatase crystalline forms have the same unit structure and are based on the octahedral arrangement of a titanium atom surrounded by six (6) oxygen atoms. It is the anatase form that results from this process and for some reason, the octahedral arrangement of the anatase form is more congenial to photo catalytic activity than the rutile form.

SUMMARY OF THE INVENTION

Disclosed is a process for producing a clear, colorless solution of a metal oxy peroxide of the formula $MO(OOH)_x$ where x is 2, 3, 4, or 6 comprising forming an aqueous solution of a metal peroxide having the formula $M(OOH)_y$, where y is 2, 3, 4, or 6 where such solution is substantially free of other peroxides of the metal, diluting the solution to a metal peroxide concentration of between about 0.5% and about 0.85% by weight of the solution at a pH in the range of from about 4.0 to about 6.5, heating the solution to boiling for a period of from about 1 to about 4 hours, cooling the solution, reheating the solution to boiling for a period of between about 1 and about 2 hours, cooling the solution, reheating the solution to boiling until the peroxide concentration in the solution is in the range of from about 12.5% to about 25% by weight of the initially present metal peroxide, and cooling the resulting clear colorless solution.

Also disclosed is a process for producing nanoparticles of a metal or metal compound of less than 10 nanometers in size. In a first embodiment, an aqueous comprising forming a solution of the metal peroxide having the formula $M(OOH)_x$ where x is 2, 3, 4, or 6 is formed. The solution is diluted to a metal peroxide concentration of between about 0.5% and about 0.85% by weight of the solution at a pH in the range of from about 4.0 to about 6.5. The solution is heated to boiling for a period of from about 1 to about 4 hours, cooled, reheated to boiling for a period of between about 1 and about 2 hours, cooled, and reheated to boiling until the peroxide concentration in the solution is essentially zero. The nanoparticles of metal oxide precipitate and are separated from the supernatant liquid and dried.

In a second embodiment of the process for producing nanoparticles of a metal or metal compound of less than 10 nanometers in size, a metal peroxide having the formula $M(OOH).sub.x$ where x is 2, 3, 4, or 6 is formed. This peroxide is decomposed to form a metal oxy peroxide of the formula $MO(OOH)_x$ where x is 2, 3, 4, or 6. The solution of the metal oxy peroxide is diluted to a peroxide concentration of between about 0.25% and about 0.425% by weight of the solution at a pH in the range of from about 4.0 to about 6.5. The solution is heated to boiling for a period of from about 1 to about 4 hours, cooled, reheated to boiling for a period of between about 1 and about 2 hours, cooled, and reheated to boiling until the peroxide concentration in the solution is essentially zero. The nanoparticles of metal oxide precipitate and are separated from the supernatant liquid and dried.

In one of its embodiments, the present disclosure relates to a novel method for producing colorless aqueous inorganic binder compositions, which can be applied to a substrate under ambient conditions to form substantially colorless amorphous coatings having strong wettability and adhesion to both hydrophobic and hydrophilic substrates. These coatings may be used alone to impart desirable characteristics to the substrate or may be used as an adhesive to attach other materials to the substrate.

In another embodiment, the present disclosure relates to substrates coated with a composition that modifies its esthetic and/or functional properties.

In another embodiment, the present disclosure relates to composite materials having finely divided particles of a first substance bonded to a like or unlike substance using the aqueous binder composition as an adhesive. This is a particularly useful material in that all its components are inorganic and able to withstand significant environmental stresses.

In a further embodiment, the problems associated with prior art amorphous metal peroxide adhesive films are overcome by changes in the adhesive film production process to remove the color prevalent in existing metal peroxide adhesive films.

In another embodiment, the wettability of metal peroxide coatings is enhanced by the use of a specified wetting agent or combination of agents, allowing thinner films to be readily applied.

In yet another embodiment of the disclosure clear colorless inorganic binder solutions are made photo-catalytic by reacting a titanium salt, preferably titanium tetrachloride with hydrogen peroxide under conditions that minimize or eliminate the production of colored by-products and that limit the size and amount of the titanium dioxide formed in the final product to within a narrow range of concentrations and particle sizes.

In yet another embodiment of the disclosure a process for producing metal oxide particles less than 10 nanometers in size is disclosed.

In yet another embodiment of the disclosure a process for producing $TiO_2$ particles less than 10 nanometers in size is provided.

In another embodiment of the disclosed process and products, the nanoparticles of metal oxide are further reacted to produce nanoparticles of a metal or a metal salt.

Other embodiments of the invention include enhanced pigments and pigment blends, architectural and structural coatings providing self cleaning and/or photocatalytic surfaces, catalysts using microparticles bound to various substrates using the disclosed solutions, mixed catalysts of microparticles in intimate contact and bound to an inert inexpensive substrate, and substrates with varying refractive indices and decorative and functional coatings.

DETAILED DESCRIPTION OF THE PREFERRED EMBODIMENT(S)

Disclosed is a process for producing colorless inorganic metal peroxide adhesive and coating solutions, the solutions and the combination of the solutions with various additives, particularly nanoparticles of metals and metal compounds, especially metal oxides, for coating of substrates, especially microparticle substrates to provide functional and/or decorative modification of the surface of the substrates.

A process of making a colorless film forming inorganic metal peroxide adhesive involves solving the problems of removing the persistent color associated with the presence of metal peroxides while retaining the adhesive or coating functionality of the composition. It has now been discovered that the critical parameters in producing a colorless metal peroxide sol having excellent film forming attributes are to 1] provide at least a stoichiometric amount of peroxide to the metal hydroxide solution used in producing the composition to convert the metal hydroxide; 2] to reduce the peroxide content in the final adhesive binder solution to between about 0.07% and 0.22%, preferably between about 0.1 to 0.2, most preferably between about 0.11% and 0.17% by weight of the final solution; 3] to maintain the final binder solution at a pH below 6.5, preferably below 6.0 and 4] to modulate the rate of conversion of the metal peroxide to the metal oxide during the final conversion step by controlled heating and cooling steps.

In a preferred embodiment, the valence of the metal used in the process, where the metal may exist in multiple valence states, is the highest of the multiple valence states permitted for that metal.

Suitable metals are those of a metal of group II and group III of the Periodic Table. Useful metals are scandium, yttrium, titanium, zirconium, hafnium, vanadium, iron, lanthanum, palladium, platinum, aluminum selenium, and tin. Metallic elements in the lanthanide series are useful. Especially useful are titanium, platinum, selenium, tin, zirconium and hafnium. Most preferred is titanium.

In a preferred embodiment, the conversion of TPA to $TiO_2$ is modulated by a processing regime comprising at least one cooling step, preferably at least two cooling steps, interspersed between at least two, preferably three, boiling steps.

Using at least a stoichiometric amount of peroxide to hydroxide minimizes the formation of insoluble or minimally soluble hydroxy or oxy-peroxides and permits the simple conversion of residual peroxides in the solution to the critical level thereby removing the color inherently present in the solution when the various metal peroxide species are present.

The novel process produces a binder solution that is clear, without coloration, adheres to porous and non-porous, hydrophilic and hydrophobic substrates and is capable of binding finely divided particulate substances to a substrate.

The binder solution is a clear colorless inorganic binder composed primarily of a metal peroxide in aqueous solution in conjunction with an oxide of the metal and what is assumed to be an intermediate species of metal peroxide-oxide.

In a preferred embodiment, the metal peroxide is titanium peroxy acid [TPA]. The TPA solution is diluted to a content in the range of from about 0.5 to about 0.85 wt. percent of the solution. The dilute TPA solution is reacted to reduce the peroxide content to an amount sufficient to provide adhesion and film formation and an anatase content in an amount below a level to cause turbidity. The reaction is believed to form an intermediate, consisting of anatase particles of about 1 to 5 nanometers in size with residual peroxide still attached. The peroxide content of this species is low enough to prevent yellow coloration.

In a second preferred embodiment, the TPA is reacted to form a binder solution which contains sufficient titanium dioxide [anatase form] with a particle size less than 5 nanometers to provide increased photo-catalytic activity but below the amount that causes turbidity in the product.

Solubility in water is a requirement of this process and is critical to its efficacy. Metals in Group II and Group III of the Periodic Table having such soluble hydroxides and peroxides are useful in the process. Other metals such as aluminum scandium, cerium, hafnium, lanthanum, platinum, selenium, titanium, tin, vanadium, yttrium, zirconium, iron, and other members of the lanthanide series of elements and other metals which can exhibit a +2, +3, +4 or a +6 valence state and can form hydroxide gels are also satisfactory. Of these, aluminum, iron and titanium are preferred and titanium is most preferred.

Although the following description is set forth in terms of titanium oxyperoxide films, it should be recognized that any metal ion (or mixture of metal ions) that forms a hydroxide gel can be employed.

A convenient starting material is the chlorinated salt of the metals of interest. The metal usually has a valance of either two, four or six and thus a formula of either $MCl_2$, $MCl_4$ or $MCl_6$. If it is unstable, the metallic halide is stabilized in concentrated HCL. This shifts the equilibrium of the reaction with water and preserves the chlorinated species in an aqueous solution. If it is not concentrated with the acid, the metallic chloride tends to react violently with the water and the carefully modulated chain of reactions of this process could not be controlled.

The sol or hydroxide that results when the solution is neutralized by adding hydroxide containing solution, such as ammonium, sodium or potassium hydroxide, will typically have a structure of $M(OH)_2$ or $M(OH)_4$ although $M(OH)_3$ and $M(OH)_6$ are also useful. These hydroxides are reacted with hydrogen peroxide to produce $M(OOH)_2$, $M(OOH)_3$ $M(OOH)_4$ and $M(OOH)_6$, the metallic di, tri and tetra and sexta-peroxides. It is preferred that where the metal used exists in several valence states, the reaction conditions and reactants should be chosen to form the peroxide of the metal at its highest valence state.

Hydrogen peroxide is added to the metal hydroxides to convert the soluble or marginally soluble metal hydroxides to a soluble state as the metal peroxides. The resulting products—soluble metal peroxides—are used in the further steps of this process. It is preferable that a minimum of a stoichiometric amount of peroxide is added to the solution to convert all the hydroxide to the metal peroxide.

In some instances, such as when titanium is utilized as the metallic cation, the initial breakdown of the metal peroxide results in a solution that can be dried to produce an amorphous mineral film. In other instances, such as where iron is the metallic cation, the peroxide is so unstable that the reaction proceeds directly to the production of nanoparticles of the metal oxide.

Where the peroxide formed is sufficiently stable it may be controllably reacted by the application of heat to rearrange it to produce a mineral film. This mineral film may then be reacted under controlled conditions to produce nanoparticles of metal oxide with various crystal structures depending on the particular metal oxide and the coordination number of the metal of the oxide.

In the case of titanium hydroxide formed by neutralization of the tetra chloride, it is important to remove the chloride ions by decanting the marginally soluble sols (hydroxyl compounds) with water and testing with silver nitrate to assure their absence. The chloride ions and their cationic counterparts, sodium and potassium ions in the respective salts, can interfere with photo catalytic and photo chemical activity.

The soluble metal peroxides-free [or with reduced levels depending on the intended ultimate use of the material] from salts or halides—that result from this process are further processed depending on the application.

In prior art processes, upon evaporation of the water from the aqueous state, the metal peroxide forms an amorphous inorganic film. This film has certain desirable characteristics but possesses certain commercially significant detriments such as coloration and opacity that have prevented widespread use. The use of dilute solutions and controlled heat treatment as disclosed herein have removed these detriments.

In many cases, depending on the metal, the amorphous film so formed is a semi conductor and acts as a binder for the nano sized particles of the oxide of the same or different metal.

The film in its own right, with or without the addition of the nano sized particles, can be catalytically active. When catalytically active particles are embedded in the peroxide film-forming component, the particles can be bonded to glass, metal, plastic or ceramic because of the reactive peroxide groups that are present in the film-forming component. In certain cases, for example in the case of titanium dioxide, the combination of the mineral film and the nano particles enhances or magnifies the photo catalytic or photo chemical effects desired.

In one embodiment, these soluble metal peroxides are transformed into nano particles by heating the aqueous solution of the metal peroxide. Decantation and evaporation of water by controlled heating at 100° C. produces a dry powder of these nano sized metal oxides. Unlike prior art processes, the process step of reducing the concentration of the metal peroxide prior to transformation allows significantly better control of the conversion rate, size and size distribution of the resulting nanoparticles. Furthermore, the produced nanoparticles do not agglomerate as with prior art processes. The nano metal oxides can be further processed to produce nanoparticles of the metal or of other metal compounds.

The narrow particle size distribution of the resulting particles is one of the important benefits of the process.

The particle size increases, and is proportional to, the length of time the solution is heated unless techniques such as those described herein are used to minimize the effect of heating on the size distribution. The geometrical arrangement of the metal oxide crystal formed depends on the coordination number of the metal.

Generalized formulas for producing general nano metallic oxides from $MX_2$ and $MX_4$ metallic salts [equivalent reactions are applicable to $MX_3$ and $MX_6$ metallic salts] are 1. stabilization of metallic chlorides in concentrated acid:

$$M(X)_{2,4} + H \rightarrow M(X)_{2,4}/HX \text{ solution} \quad [A]$$

neutralization of acid metallic chloride:

$$M(X_{2,4}/HX + (2 \text{ or } 4)NH_4OH \rightarrow M(OH)_{2,4} + (2 \text{ or } 4)NH_4X \quad [B]$$

addition of hydrogen peroxide to the metallic hydroxide and formation of metallic peroxide:

$$M(OH)_{2,4} + (2 \text{ or } 4)H_2O_2 \rightarrow M(OOH)_{2,4} \quad [C]$$

formation of nano particles upon heating peroxide solution:

$$M(OOH)_{2,4} + \text{heat} \rightarrow M(O)_6 \text{ anatase octahedral polymorphs} \quad [D]$$

$$M(OOH)_{2,4} + \text{heat} \rightarrow M(O)_4 \text{ tetrahedral and planar polymorphs} \quad [E]$$

formation of amorphous films from metal peroxides:

$$M(OOH)_{2,4} \rightarrow M(O)n/k \quad [F]$$

Titanium oxides exist in several forms. The three natural forms of titanium oxide are rutile (highly crystalline, the octahedral units joined with each other on two edges), anatase (crystalline, but with the octahedral units joined together with other units on four edges) and brookite (less crystalline, with the distorted octahedral units joined on three edges, and amorphous). The titanium oxides are not soluble in water. The rutile and anatase forms of titanium oxide are photo catalytic, but the anatase form is more so. The brookite form is not photo catalytic.

Titanium tetrachloride $TiCl_4$ is a liquid that is rapidly hydrolyzed with water to produce a white smoke used in sky writing. For use in the present process, the material must be stabilized in sufficiently strong hydrochloric acid. It is convenient to use 2N HCl. It is found that cooling the 2 N HCl to 5° C. before adding the $TICl_4$ slows down the formation of side reactions as the $TiCl_4$ dissolves into the acid/water.

The $TiCl_4$/HCl solution is neutralized with 2 N ammonium hydroxide, $NH_4OH$, producing titanium tetrachloride, $Ti(OH)_4$, and ammonium chloride, $NH_4Cl$.

The $NH_4Cl$ must be removed before addition of the peroxide. This is done by separation of the $Ti(OH)_4$ from the $NH_4Cl$ by any convenient separation technique such as by the addition of distilled water and separation of the precipitated $Ti(OH)_4$. This process is continued until the chloride content as measured by silver nitrate titration is at or below 0.05% concentration of the solution.

$TiCl_4$@5° C. at 0.25 Molar concentration+1 L 2N HCl=$TiCl_4$/2N HCL aqueous solution.

$TiCl_4$/2N HCl+2N $NH_4OH$=$Ti(OH)_4$+$NH_4Cl$ $Ti(OH)_4$+distilled water/phase separation=$Ti(OH)_4$; Cl content less than 0.05%.

In prior art processes, the Ti(OH)$_4$ will start to dissolve and the separation becomes more difficult when the chloride concentration is below 0.05%. In prior art processes, at least 500 parts/million of ammonia are left in the solution to stabilize the anatase particles formed later in the process. This causes problems because the particles will more readily precipitate if ammonium ion is not present. The present process can use much less, e.g. 250 parts/million of ammonium ion, to stabilize the anatase crystals. Thus, the level of chloride ion can be dropped further using decantation, avoiding the necessity of using ion exchange resins to lower the chloride ion content. Since chloride ion content interferes with the photo-catalytic effect it should be minimized if such effect is desired after further processing.

In a preferred embodiment, the process begins with the peroxidation of titanium tetrahydroxide [titanic acid]. The peroxidation reaction yields different results depending on the amounts of reactants introduced to the reaction and on the reaction conditions.

The following equations show the resulting compounds at various ratios of reactants $$Ti(OH)_4 + 1H_2O_2 \rightarrow Ti(OH)_3(OOH) + 1H_2O \quad [1]$$

$$Ti(OH)_4 + 2H_2O_2 \rightarrow Ti(OH)_2(OOH)_2 + 2H_2O \quad [2]$$

$$Ti(OH)_4 + 3H_2O_2 \rightarrow Ti(OH)(OOH)_3 + 3H_2O \quad [3]$$

$$Ti(OH)_4 + 4H_2O_2 \rightarrow Ti(OOH)_4 + 4H_2O \quad [4]$$

Above a ratio of 4 to 1 there are no hydroxyl groups on the titanium hydroxide Ti(OH)$_4$ to further react with the peroxide and the addition of excess peroxide results in no changes to the final products.

It is critical to the operation of the process and production of the clear metal peroxide film that the reactants and the reaction conditions are such that the reaction of the hydroxide and the peroxide yields essentially only a single metal peroxide. It is preferable that that metal peroxide be the peroxide of the metal at its highest valence state.

Once a TPA solution essentially free of significant quantities of other peroxide species is obtained, the solution can be further processed to obtain an amorphous film forming binder solution that is clear and colorless.

The stability of the peroxides decreases as the number of peroxide units increase. Thus, the monoperoxide produced in reaction [1] is more stable than the diperoxide of reaction [2], etc.

The stability of the titanium tetraperoxide produced by reaction [4] is so low that it must be kept at temperatures below 5° C. to prevent degradation. Above 5° C. the titanium tetraperoxide reacts to form titanium oxyperoxide [TPA]. [1]

A comparison of the reaction products produced when the ratio of hydrogen peroxide to titanic acid, Ti(OH)$_4$, is less than 4 to 1 with those which occur when the ratio is approximately 4 to 1 is illustrative of the significant differences between the present process and the prior art processes.

Some TPA will be produced regardless of the reaction and the ratio of hydrogen peroxide to titanic acid. Thus for example, as utilized by the prior art processes, TDDA produced by reaction [2] can be converted to TPA by the dehydration of titanium dihydroxy diperoxy acid [TDDA]. The reaction is as follows:

$$Ti(OH)_2(OOH)_2 \leftrightarrow TiO(OOH)_2 + H_2O \quad [6]$$

Since there is an overwhelming amount of water present the equilibrium is driven to the left and, in water solution TDDA, not TPA, is the dominating species present. Additionally TDDA is a relatively stable peroxide and thus significant heat input is required to first drive off the water and then decompose the TDDA. Because of the high energy input required it is difficult to control the reactions which cause significant problems in further processing and with the quality of the product obtained.

TDDA yields by-products during the dehydration process [6] of which the following condensation reaction is an example.

$$2Ti(OH)_2(OOH)_2 \rightarrow Ti_2O(OH)_4(OOH)_2 \quad [8]$$

This is a yellow compound. It is not converted into TPA. At boiling temperatures it is slowly converted into TiO$_2$ but crucially, the yellow color persists until it is fully converted. It also contributes to opacity and non-clarity of the binder solution.

Another soluble species formed when the ratio of titanium hydroxide to hydrogen peroxide is less than about 4 to 1 is Ti(OH)$_3$(OOH). It is produced in small amounts with a 2:1 hydrogen peroxide molar ratio but not with a 4:1 hydrogen peroxide ratio. It is a stable peroxide and as such is colored yellow. Ti(OH)3(OOH) is not converted into TPA. It persists in the solution until the end point when all the peroxides present are converted into anatase. Its presence contributes to a yellow colored binder solution.

Thus, when TPA is produced from a peroxide other than Ti(OOH)$_4$ [Eq. 4] other peroxide species are present in the solution, all are yellow in color, and all persist until all the peroxides are converted to anatase. When all the peroxide is converted to anatase the product becomes white, it loses its film forming capabilities and cannot function as a binder. Prior to the time the peroxides are all converted to anatase, the various species remain and the solution remains yellow.

As described above [Eq. 6 the tetraperoxide is the least stable of the peroxy species present in the solution and thus is the first to form TPA. Furthermore its lower stability permits significantly greater control over further processing parameters, in particular when it is used at low concentrations. This is also true of the other metal peroxides.

Thus, unless a procedure can be found where titanium tetraperoxy acid is the only peroxide compound present in solution it will be impossible to form a clear, colorless solution which retains its adhesive functionality.

With TPA as the only peroxide compound present in solution, the peroxide content can be reduced by conversion of a majority of the TPA to TiO$_2$ to the point where the yellow color is not visible but where a sufficient quantity of the peroxide remains present to allow film formation.

Anatase TiO$_2$ may be produced from either TPA or from TDDA. The reaction producing TiO$_2$ from TPA is as follows:

$$TiO(OOH)_2 \rightarrow TiO_2 + H_2O + O_2 \quad [7]$$

When TDDA is used, it must first be dehydrated to produce TPA [6] and then in a second step produce anatase.

Furthermore, another crucial aspect of the disclosed process is that the relative instability of the TPA allows conversion to take place under relatively mild reaction conditions such that the amount of residual peroxide present can be carefully monitored and controlled.

A 2/1 ratio makes the solution less acidic. TDDA is less acidic than pure TPA. As the peroxide decomposes producing TiO$_2$ and oxygen, the pH becomes more alkaline. It is found that pure TPA when being converted by boiling to anatase becomes more alkaline than when the TDDA produced from a 2/1 ratio is used. It is important to control the pH so it does not rise above a pH of about 6.5 during processing. Preferably the pH is maintained in the range of from about 4.0 to about 6.0.

There are intermediate steps in the production of the amorphous $TiO_2$ film. At boiling temperature, the peroxide content is dissipated and $TiO_2$ anatase is produced. However, at ambient temperatures slow condensation reactions occur that indeed produce a mineral polymer matrix. This is unique in the inorganic world as polymers are usually called crystals and minerals. The amorphous state allows a non crystalline polymer of film to be produced.

When the TPA is exposed to conditions that cause dehydration of the compound, a dimer is formed, as follows: dehydration

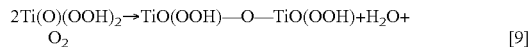  [9]

The dimer can again condense as follows:

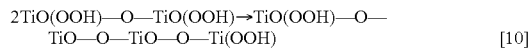  [10]

This condensation continues at high temperatures and a polymer is produced until eventually all the peroxide is gone. Prior to completion, there is residual peroxide present, though at a decreased level, as the condensation process continues. At a certain level of remaining peroxide, the yellow color disappears.

The disappearance of the yellow color occurs only when the level of all peroxides in the solution are condensed to the critical level. This can only occur when the starting material is essentially free of polymerizable peroxides, e.g. when the peroxides in the starting material are essentially all TPA.

As the condensation proceeds with applied heat a portion of the polymer eventually will convert to anatase and no longer be a film former. The titanium and the surrounding oxygen atoms become coordinated due to the d-orbitals into octagonal unit structures that assemble into the anatase crystal structure. This does not occur at temperatures under 100° C.; the amorphous polymer is stable.

It is crucial that the concentration of the TPA in solution be reduced to the level specified to delay the formation of anatase during further processing of the TPA and to allow a controlled reduction of the peroxide content to achieve a balance of peroxide content with anatase.

The peroxide content remaining in the TPA is reduced to below the yellow coloration threshold of about 0.22% but is maintained at level sufficient to allow film formation during further processing.

The anatase produced at this threshold is photo-catalytic. As the peroxide content decreases to about 0.07% the film forming capability remains and the photocatalytic capability of the solution increases. The anatase and peroxide present at this concentration produce a non-yellow and photo-catalytic film upon further processing. Below about 0.07% the film forming capability of the solution is lost.

The resulting mixture of anatase and peroxide differs substantially from the solution resulting from the mixing of anatase into a solution of TPA as in the prior art procedures that do not remove the yellow color from the solution.

The concentration of the peroxide is measured using a dilute 0.01 to 0.05 N solution of potassium permanganate in 1 N sulfuric acid.

It has been determined that the colorless range starts with a peroxide reduction of 50% from the original peroxide concentration but not less than 25% of the original concentration. In the case of titanium, the concentration of the TPA in solution is in the range of 0.5% to about 0.85% before reaction. Of this about half of the weight of the TPA molecule is attributable to the peroxide moiety. Thus the peroxide concentration [as distinguished from the metal peroxide concentration] in the solution prior to reaction is in the range of from about 0.25% to about 0.43%. Therefore, the solution becomes colorless when the peroxide content is reduced to a range of from about 0.07% to about 0.22% by the heating, and cooling cycles described herein. It should be noted that merely reducing the peroxide content to this range without following the temperature cycling procedure does not yield a colorless solution.

An additional advantage of the disclosed process is a clearer solution and more uniform anatase particle size distribution in the 5 to 10 nanometer range. This is important in applications where the coating is applied to a transparent substrate where large particle sizes produce opacity and turbidity.

The $Ti(OH)_4$ is cooled to 5° C. Peroxide equal to four times the molar level of titanium is cooled to 5° C. and added. The addition of 4 moles of peroxide assures complete reaction to form $Ti(OOH)_4$. $Ti(OOH)_4$ is very yellow and opaque. It is unstable above 5° C. and decomposes to produce TPA water and oxygen.

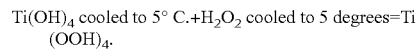

The solution gradually becomes transparent as the oxygen is evolved and the TPA is formed. It is found that the clearer the TPA solution produced the clearer will be the final product produced once the TPA is heated for a prolonged period of time.

The concentration of TPA is reduced to a concentration in the range of from about 0.5% to about 0.85% by weight of the solution [peroxide content of 0.25% to about 0.43%] as opposed to the prior art processes which disclose 1 to 2 percent concentration.

This low concentration slows the production of anatase crystals and allows the peroxide to convert to $TiO_2$ at a slower rate than if at a higher concentration. A window opens that allows the presence of the peroxide and of very fine anatase particles to be present in a useful ratio. For a colorless solution that is photo-catalytic a maximum concentration of anatase particles with enough peroxide to remain to insure film formation is desirable.

If all the peroxide is converted, the particle size continues to grow as the peroxide content is decreased. Eventually the particles sizes become so large they are no longer able to remain in solution and precipitate. Small diameter nanoparticles of 1 to 5 nanometer particle size are assured by terminating the reaction while a small peroxide content remains. The small size gives increased clarity as well as enhanced photo-catalytic activity.

$TiO(OOH)_2$ is TPA. The $TiO(OOH)_2$ is measured using 0.1 or 0.01N permanganate, in $H_2SO_4$.

Once the concentration of TPA has been determined a sufficient quantity of distilled water is added to reduce the concentration of the TPA to 0.5 to 0.8 weight percent of the solution.

The dilute TPA solution is heated to boiling for a period of from about 1 to about 4 hours, preferably from about 2 to about 4 hours. In an alternative embodiment it is boiled under reduced pressure, typically about 0.6 atmos. In a critical step, the TPA is cooled to ambient temperature prior to completion of the heating. The TPA is then again heated to boiling. This cycle is preferably repeated twice until the peroxide content reaches the desired level. The color of yellow fades as the peroxide content is reduced. When the yellow color disappears, the solution is cooled and the peroxide content is measured.

To prepare a binder solution, the peroxide content is allowed to fall to ¼ to ½ the initial value but no lower. At this level, the yellow has disappeared but sufficient peroxide content is available to form a film. Anatase begins to be present at this concentration of peroxide. It consists of a fine, less than 10 nanometer size diameter. At this size the anatase does not affect the transparency of the solution. The optimum balance occurs at a ¼ percent value of the initial peroxide content. This assures a high enough level of anatase particles for photo-catalysis. The resulting solution is a colorless clear solution suitable for coating over transparent surfaces.

While not confirmed and without intending to be bound by the explanation, it is believed that the small size of the anatase particles is maintained by the presence of an intermediate material consisting of joined anatase unit structures in an octahedral array with residual peroxide still attached to the array. This is in effect a small anatase particle with peroxide still attached. The attached peroxide assures the smallness since it has not been reacted and caused further anatase growth in size.

The non photo-catalytic colorless binder has many applications.

It may be utilized as a binder to bind $TiO_2$ [rutile form] pigment to a variety of substrates. In particular, it may be utilized as a binder to bind $TiO_2$ (rutile form] pigment to micron-sized spherical particles, most particularly microspheres of glass. Such products can be used to increase the opacity or other desirable characteristics of coatings or paints while minimizing the amount of $TiO_2$ used in the coating or paint. A particularly useful application is in the application of white lines marking lanes on roads and highways.

The non photo-catalytic colorless binder provides significant benefits in that it reduces the amount of $TiO_2$ [rutile form] that must be added to the coating or paint thereby further increasing the cost. Because even trace amounts of yellow reduce the whiteness and brightness of the coating and require more rutile pigment to be used, coating a colorless binder that adheres the rutile pigment to a substrate requires less rutile and reduces the cost.

The non photo-catalytic colorless binder is useful as a general binder of micron sized particles to be bonded to ceramic, metal glass and certain plastics. In particular it is useful as a general pigment binder of pigments to be bonded to various substrates, especially ceramic, metal glass and certain plastics.

The non photo-catalytic colorless binder is useful by itself as a protective coating for masonry and architectural finishes on the exterior of buildings or other structures.

The non photo-catalytic colorless binder is useful by itself as a barrier coating over painted metal and other surfaces that would be attacked by environmental conditions.

The non photo-catalytic colorless binder is useful by itself as a barrier coating over susceptible substrates or coatings prior to the application of a photo-catalytic coating. Thus, for example, where a photocatalytic coating applied directly over a painted surface might cause degradation of the paint, the binder would act to minimize the effect of the photo-catalytic coating. There is significant application of the binder as a barrier coating between automotive panels and automotive self-cleaning [photo-catalytic] coatings.

Where the binder is applied to a glass surface a prime coat of the binder would block migrating sodium and chloride ions from the glass and thus increase the photo-catalytic efficiency of a photocatalytic coating applied over the binder coated glass substrate.

Where the binder is produced with a level of $TiO_2$ [anatase form] to provide photocatalytic activity, the coating provided significant benefits when applied over transparent surfaces such as glass where high levels of transparency and light transmission are required.

The photo-catalytic colorless binder has many applications. Among its many applications may be included anti graffiti sprays; architectural coatings; sterilization coatings for hospitals and public gathering places; self-cleaning transparent glass; self-cleaning automotive surfaces; self-cleaning textiles, i.e. for medical and civilian uses; coating on paper money; water pollution control by means of the surface treatment of glass beads as carriers of a photo catalytic coating; the surface treatment of hollow glass beads for use in oil spills; self-cleaning outdoor carpeting.

In its photocatalytic embodiment, the binder provided significant benefits as a coating over surfaces where preservation of the underlying colors is desired, over white surfaces and light shades where non yellowing is important, as a hygienic coating where non-yellowing and clarity are important, and as a coating over white porcelain surfaces and ceramic tiles. Preferably, a coating of the non-catalytic embodiment of the coating is added between the painted substrate and the photocatalytic coating.

The substrate to which the binder is applied may be made of inorganic materials such as ceramics, glass and the like, organic materials such as plastics, rubber, wood, paper and the like, and metals such as aluminum, steels and the like. Organic polymer resin materials, such as acrylonitrile resin, vinyl chloride resin, polycarbonate resins, methyl methacrylate resin (acrylic resins), polyester resins, polyurethane resins and the like are useful substrates. The substrate is not critical with respect to the size or shape and may be in the form of a honeycomb, fibers, a filter sheet, a bead, a foamed body or combinations thereof. If a substrate which allows transmission of UV light is used, a photocatalytic body may be applied to the inner surface of the substrate.

In its catalytic embodiments, other than photocatalytic embodiments, the microsphere-binder combination can be used as a substrate for nano size catalysts such as hydrogenation catalysts, (i.e. palladium, platinum and cadmium oxides), oxidation catalysts (i.e. nickel) and polymerization catalysts (i.e. tin and titanium), among others.

Using the binder, a catalytic moiety can be bonded to ceramics, tiles or spheres; to metal substrates such as aluminum; or to glass or to glass ceramics.

Coated glass spheres in the under 20 micron size, and even more so at the 10 micron or under size, allow their incorporation in paints and coatings where thin applications are required for technical, as well as economical reasons. For example, some paints are applied at a thickness of only 10 microns so coated glass microspheres with larger diameters would protrude from the resulting film.

As another example, in water purification, coated microspheres could be packed in large quantities in tubes. When water is then passed through these tubes and comes in contact with the coated microspheres, the UV light source present activates the photocatalytic coating, resulting in the oxidation of any organic materials present in the water.

This binder solution, in its photocatalytic form, can also be applied to hollow glass beads so that in the case of oil spills, for example, oil and organic materials floating on the water's surface would be oxidized when they came in contact with the coated beads.

Another application of the colorless adhesive solution is as a binder for pigments of from 1000 nanometers and under to varying substrates, particularly including glass microspheres. The presence of any coloration in the binder adversely affects the color particularly a white color where the pigment is rutile titanium dioxide. The removal of coloration makes brighter colors in the wave length of the desired color.

An application is as a substrate for pigments or other colorants that reduces the amount of colorant required to produce the specified intensity of color.

The surface treatment of glass microspheres with a metal peroxide solution, particularly a titanyl peroxide solution, results in creation of a mineral film that adheres to the microspheres. This surface treatment can be applied with a brush, by spraying the microspheres or, probably the most effective way, by immersing the microspheres completely in the titanyl peroxide solution. Upon evaporation of the water at room temperature or with the application of heat to facilitate evaporation (but not to facilitate formation of anatase particles), the peroxide dissipates and the resulting mineral film bonds to the glass microspheres. This film is permanently bonded to the microspheres and will not dissolve or wash off, even when re-immersed in water.

Where additional binding is required, a wetting agent may be used in conjunction with the binder. However, many wetting agents do not function properly in the inventive system. It has been found that polyethylene oxide silane wetting agents, of which Dow Chemicals Silicone Q25211 super wetting agent is a preferred example do not interfere with the adhesive qualities of the film former yet allow the film former to coat the different substrates to which it is applied.

A particularly significant application of the disclosed method of producing nano particles from metal compounds that produce stable hydroxides and have a valence of at least two, and are preferably selected from Fe, Cu, V, Ca, Cr, Co, Pt, Zr, or Nb relates to their use in the field of pigments. There are two important aspects to this discovery.

First, the disclosed production techniques for the production of nano particles allow a broader range of nano-sized particles to be utilized as pigments themselves. While some organic pigments, such as carbon black, are available in nano size ranges, this process allows inorganic metal oxides and from them metals and metal compounds to be produced in the nano size range. These metal oxides are the basis of many colors in the pigment field. For example, the iron oxides produce red pigments; the cobalt oxides produce blue color; cadmium and chromium oxides produce yellow colors. Vanadium dioxide is also a blue pigment.

The second significant discovery relates to the fact that solid or hollow glass microspheres can now be used as carriers of a wide range of metal oxide-derived films and nano particles. The mineral film formed by evaporation of the peroxide solution provides an adhesive coating that allows the nano size particles to be attached to any substrates to which the peroxide solution is applied. The inverse relationship between volume and surface area (3/r), where r is the radius of the sphere, results in an increase of the surface area per unit weight of the material as the radius and thus the volume of a sphere decrease.

The glass sphere carrier has more surface area to which nano particles of an even smaller size can be attached while at the same time preventing agglomeration of the particles. With appropriate sizing of the glass spheres and attached particles, surface area can be optimized for each application. The overall result is a maximization of exposure of the surface area of the metal oxide, both from their inherent small size and from their attachment to the glass micro sphere "carriers". The intensity of the color can be increased due to both the small nano scale of the metal oxide pigments and to the light refraction of these nano size particles, which occurs as a result of their attachment to the glass spheres. For the same reason, increased catalytic activity can be obtained by attaching catalytic nanoparticles to the glass spheres to modulate catalytic activity.

Use of glass microspheres as a pigment carrier also imparts characteristics to the nano pigment that previously might have been lacking. The glass sphere carrier provides, in many cases, a harder or stronger pigment, may assist in the flowability or dispersion of the pigment in some paints or coatings, and may impart characteristics, such as infra red reflectance of heat, that are known characteristics of glass spheres themselves.

In addition to the general category of nano particles with applications as pigments, there are other important applications where glass, ceramic or plastic microspheres can be used as the delivery mechanism for other metal oxides. The coating or surface treatment of glass microspheres with mineral film and embedded nano size metal oxides such as platinum and nickel oxides could offer significant cost and weight advantages over current catalytic converter technology used in automobiles. Since the film is stable at temperatures up to at least 500° C., it may be used in severe chemical processing environments.

EXAMPLES

Example 1

Preparation of Titanium Tetrachloride

A sufficient quantity of concentrated HCl is mixed with distilled water to form a 2 N HCl solution. The temperature is lowered to 5° C.

Twenty-five [25] ml of a 100% solution of titanium tetrachloride, equivalent to adding 43.15 grams or 0.2274 moles $TiCl_4$/liter of solution of $TiCl_4$, at 5° C. is added per liter of water 2 N HCl solution. This low temperature allows the titanium tetrachloride to hydrolyze and dissolve in water without causing side reactions or reacting over vigorously. Too high a temperature can produce opaque materials and interfere in the next processing steps.

The ratio of $TiCl_4$ to HCl is preferably about 9 parts HCl to 1 part of the $TiCl_4$. It is possible to have higher concentrations of $TiCl_4$ but then the normality of the HCl must also be increased and, during the neutralization process, this produces more $NH_4Cl$ which must be removed by decantation or centrifugation. It is important to reduce the chloride ion to under 0.05% of the solution where the binder is intended to be used with photocatalytic moieties.

Example 2

Preparation of Titanium Hydroxide

While maintaining the reactants at a temperature of 5° C., a sufficient quantity of 2 N ammonium hydroxide is slowly added to the $HCl/TiCl_4$ solution to neutralize the acid from the 2N HCl and from the 0.2274 moles of $TiCl_4$ which produces 0.9097 moles of acid/L in addition to the HCl present from the HCl solution.

The resultant titanium hydroxide is produced in the form of a white precipitate sol. This sol is repeatedly washed (decanted) in a separatory funnel until the percent chlorine is reduced to no more than 0.05% by weight of the solution as measured using the Mohr method (silver nitrate titration).

As the chloride content approaches the 0.05% level the solution starts to turn white and cloudy due to $Ti(OH)_4$ redissolving in the chloride free solution.

High levels of chloride ion prevent the $Ti(OH)_4$ from re-dissolving in the water. The competing equilibriums of ammonium chloride ions in solution with $Ti(OH)_4$ molecules drives the reaction and prevents the $Ti(OH)_4$ from re-dissolving.

The $Ti(OH)_4$ produced is dried and weighed. A yield of 26.35 grams/l of $Ti(OH)_4$ is recovered from the 43.15 grams of $TiCl_4$/l initially present.

Example 3

Preparation of TPA

A 30 percent hydrogen peroxide solution is chilled to 5° C. and added drip wise over a time period of 15 minutes to the chilled solution of $Ti(OH)_4$ containing less than 0.05% chloride ion.

The total amount of hydrogen peroxide added is equivalent to 4 times the molar amount of the titanium hydroxide present or 0.9097 moles/L, equivalent to 30.92 grams of 100% hydrogen peroxide per liter. At a 30 percent concentration this is 106.25 grams $H_2O_2$ per liter of $Ti(OH)_4$ solution.

The reaction of the $H_2O_2$ and $Ti(OH)_4$ produces TPA. The concentration of the TPA is reduced by adding sufficient distilled water to lower the concentration to 20.45 grams per liter, equivalent to 0.1574 moles of TPA per liter equal to a concentration of TPA of 2.045% by weight of the solution as determined by titration against permanganate.

Example 4

Preparation of Clear, Colorless Binder Solution

The TPA produced in Example 3, at an original concentration of 2.045% and diluted to a concentration of 0.65% [peroxide content of 0.327%] is heated to a temperature of 100° C. for a period of 3 hours. The solution is then cooled to room temperature for an hour and then heated to boiling. Heating proceeds for another 2 hours and then the product is cooled again at room temperature for one hour and reheated to boiling a third time.

After cooling, it is tested to determine the final peroxide content by titration against permanganate and the amount of peroxide is measured by calculating the amount of permanganate consumed indicated by an end point of a permanent purple color due to unreacted permanganate. The final peroxide concentration was 0.15%.

Example 5

Preparation of Photo-Catalytic, Clear, Colorless Binder Solution

The TPA produced in Example 3, diluted to a concentration of 0.65 wt % [0.327% peroxide] is heated to 100° C. for a period of 3 hours and the cooled to room temperature for 1 hour before heating to boiling for 2 hours and again cooled to room temperature for 1 hour. It is heated to boiling a third time until the peroxide content reaches 0.10%. It is tested to determine the final peroxide content by titration against permanganate and the amount of peroxide is measured by calculating the amount of permanganate consumed. The final peroxide concentration was between 0.11% by weight of the total solution The solution was clear and colorless in appearance.

Exemplary techniques for preparing coated substrates are as follows:

Example 6

Preparation of Coated Microspheres

Soda lime glass spheres (PS 1011) obtained from Potters Industries, Inc. having a refractive index of 1.54 as determined using standardized refractive index liquids and having a diameter of between 4 to 20 microns are prepared for coating by placing them in a beaker equipped with a magnetic stirrer and a heating mantel. The distribution curve of the spheres is Gaussian, as described by a normal distribution curve.

The beads are washed with about 15% of their weight of isopropyl alcohol and removed from the alcohol. One hundred grams of the washed beads and 153.84 grams of the solution of Example 4 was added to the glass in a coating vessel. A batch stirrer was used to constantly mix and stir the beads.

To assist the wetting of the beads, 20% of the weight of the glass beads of isopropanol and a wetting agent, polyethylene oxide silane, in an amount equal to 5% of the weight of the binder solution was added to the beads in the coating vessel.

The beads were heated to a temperature of 80° C. for a period of about 3 hours to evaporate the liquid. The coated beads were removed from the vessel when they were dry. The refractive index of the free flowing coated beads was determined by the method specified above and was found to be at least 2.0.

Example 7

Alternative Drying Technique

The procedure of example 4 was followed except that an alternative drying technique using vacuum distillation and low temperatures is utilized where the boiling temperature is reduced with a vacuum. The beads were heated in a vacuum chamber at a pressure of 0.6 atm and at a temperature of about 80° C. until dry, approximately 1 hour, to evaporate the liquid.

The coated beads, containing a clear and colorless, adherent film, are removed from the vessel when they are dry. The refractive index of the free flowing coated beads is determined by the method specified above and is found to be at least 2.0.

Example 8

Preparation of a Colorless Mineral Film on a Substrate

A 5".times.5" plate of glass was washed with isopropanol to remove dirt and to clean the surface of the glass. Black electrical tape was placed around the edges to form a container for the liquid binder solution. About 10 ml of the liquid binder of Ex. 4 was placed on the glass and the liquid allowed to spread across the surface. The glass plate was then placed on a ceramic heater and the water is allowed to evaporate. A film of amorphous titanium oxide is produced. The film was clear and colorless and adheres to the glass.

Example 9

Preparation of a Colorless Catalytic Film on a Substrate

Several 5".times.5" plates of glass were washed with isopropanol to remove the dirt and to clean the surface of the glass. Black electrical tape was placed around the edges of each to form a container for the liquid binder solution having a peroxide content of 0.110% to 0.08% as per Example 5. About 5 ml of the binder solution was placed on the glass and the liquid allowed to spread across the surface of the glass. The glass plate was then placed on a ceramic heater and the water allowed to evaporate. An amorphous film covered the surface of the glass. The film was clear and colorless and adhered to the glass.

To determine the photo-catalytic activity of the coating, a photo sensitive dye was brushed on the coated surface and allowed to dry. For comparison, the same dye was brushed on a plain glass plate. A dyed plate and a control plate were placed either 1] under a 15 watt UV light source or 2] in sunlight.

In sunlight, the color on the coated glass plate vanished within 2 hours. Without the coating on a glass plate (control), the color took much longer to become even slightly dimmed.

Under a 15-watt UV light source the color on the coated glass plate vanished within about 12 hours. The plate without the coating was not affected at all.

Example 10

Use of the Film as an Adhesive to Bind a Nanoparticle [or Larger] to a Substrate One kilogram of glass beads having a diameter of between 500 and 1000 microns were washed with water. The glass beads were then mixed with 200 gm. of isopropanol and 0.50 gm. of polyethylene oxide silane. 1538.46 gm. of the solution of Example 4 was added to the bead mixture.

One hundred grams of rutile pigment, used to provide white opaque coatings, was added to the solution with stirring. A mixing blade continuously stirred the batch as heat was applied to increase the temperature to about 65° C. and the water allowed to evaporate. When the water evaporated, a thin transparent clear coating with adhered rutile pigment is present on the surface of the glass spheres.

The pigmented glass spheres were spread out in a drying pan and placed in an oven at 100° C. for about three hours. At the end of the drying time the beads, with adhered pigment, were removed from the oven, cooled, packaged and stored.

The invention claimed is:

1. A process for producing nanoparticles of a metal or metal compound of less than 10 nanometers in size comprising forming an aqueous solution of the peroxide of the metal or metal compound having the formula $M(OOH)_x$ where M is a metal, where x is 2, 3, 4, or 6 from a hydroxide sol of the metal, diluting the solution to a metal peroxide concentration of between about 0.5% and about 0.85% by weight of the solution at a pH in the range of from about 4.0 to about 6.5, heating the solution to boiling for a period of from about 1 to about 4 hours, cooling the solution, reheating the solution to boiling for a period of between about 1 and about 2 hours, cooling the solution, and reheating the solution to boiling until the peroxide concentration in the solution is essentially zero and separating the nanoparticles.

2. The process of claim 1 where the metal peroxide is selected from the group consisting of peroxides of a metal of group III of the Periodic Table.

3. The process of claim 1 where the metal peroxide is selected from the group consisting of peroxides of a metal of group II of the Periodic Table.

4. The process of claim 1 where the metal peroxide is selected from the group consisting of peroxides of scandium, lanthanum, yttrium, platinum, selenium, tin, vanadium, zirconium, hafnium, aluminum and iron.

5. The process of claim 1 where the metal peroxide is $Ti(OOH)_4$.

6. A process for producing nanoparticles of a metal or metal compound of less than 10 nanometers in size comprising forming an aqueous solution of a metal oxy peroxide of the formula $MO(OOH)_x$ where x is 2, 3, 4, or 6, by decomposition of a solution of the peroxide of the metal or metal compound having the formula $M(OOH)_y$ where M is a metal, where y is 2, 3, 4, or 6, which was formed from a hydroxide sol of the metal, diluting the solution of the metal oxy peroxide to a peroxide concentration of between about 0.25% and about 0.425% by weight of the solution at a pH in the range of from about 4.0 to about 6.5, heating the solution to boiling for a period of from about 1 to about 4 hours, cooling the solution to ambient temperature, reheating the solution to boiling for a period of between about 1 and about 2 hours, cooling the solution to ambient temperature, and reheating the solution to boiling until the peroxide concentration in the solution is essentially zero and separating the nanoparticles.

7. The process of claim 6 where the metal peroxide is selected from the group consisting of peroxides of a metal of group III of the Periodic Table.

8. The process of claim 6 where the metal peroxide is selected from the group consisting of peroxides of a metal of group II of the Periodic Table.

9. The process of claim 6 where the metal peroxide is selected from the group consisting of peroxides of scandium, lanthanum, yttrium, platinum, selenium tin, vanadium, zirconium, hafnium, aluminum and iron.

10. The process of claim 6 where the metal peroxide is titanium peroxy acid.

* * * * *